June 11, 1963 W. I. McLAUGHLIN 3,093,467
VAPOR SEPARATOR AND FILTER FOR COMPRESSED AIR
Filed Sept. 15, 1958 2 Sheets-Sheet 1
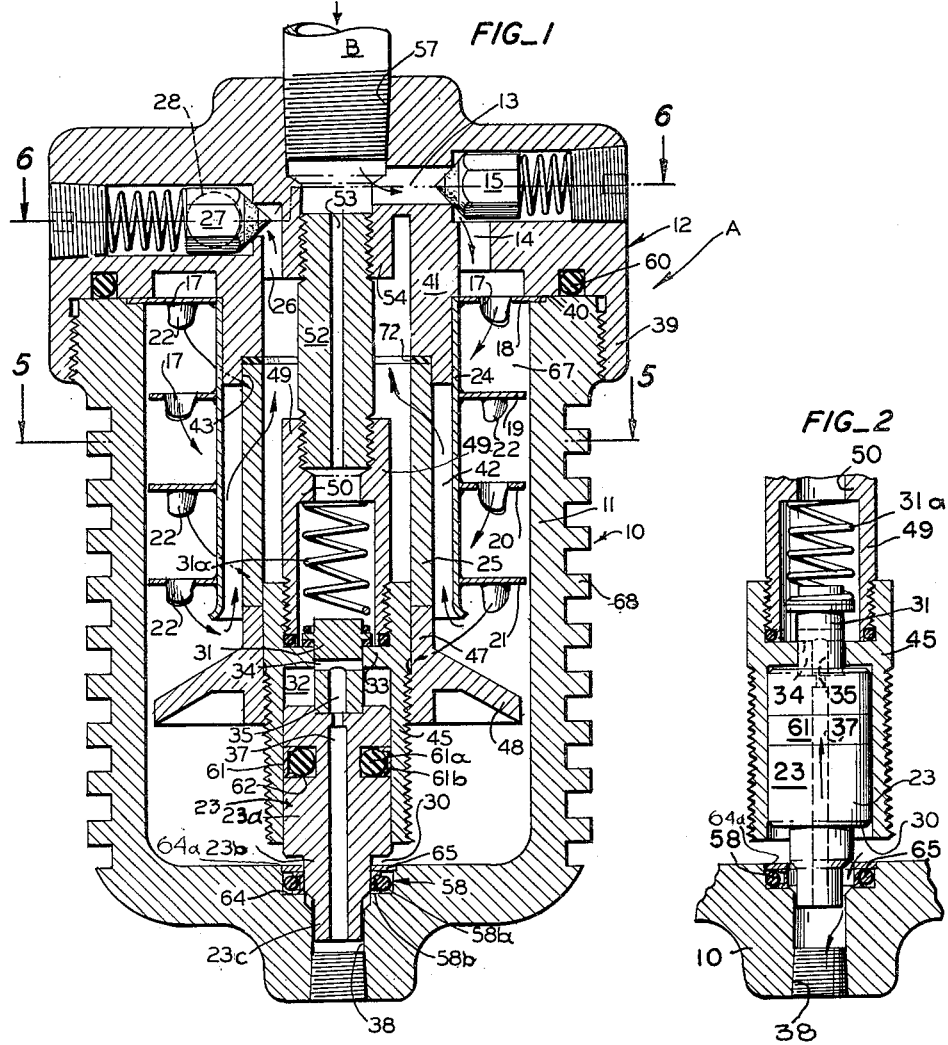
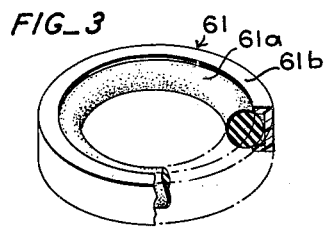
INVENTOR.
WILLIAM I. McLAUGHLIN
BY
Hansen and Lane
ATTORNEYS June 11, 1963  W. I. McLAUGHLIN  3,093,467
VAPOR SEPARATOR AND FILTER FOR COMPRESSED AIR
Filed Sept. 15, 1958  2 Sheets-Sheet 2
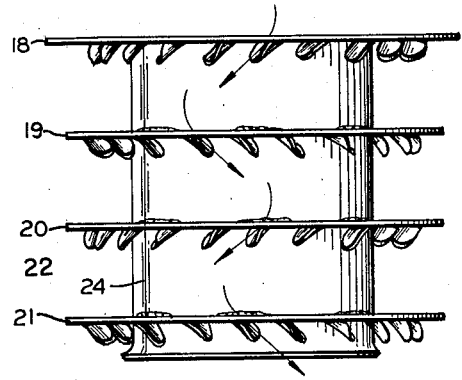
FIG_4
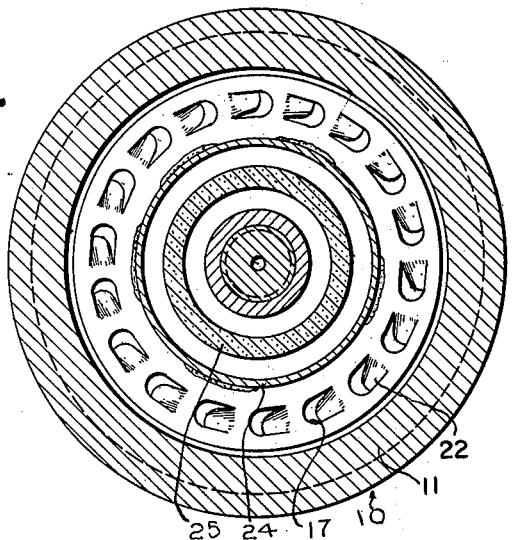
FIG_5
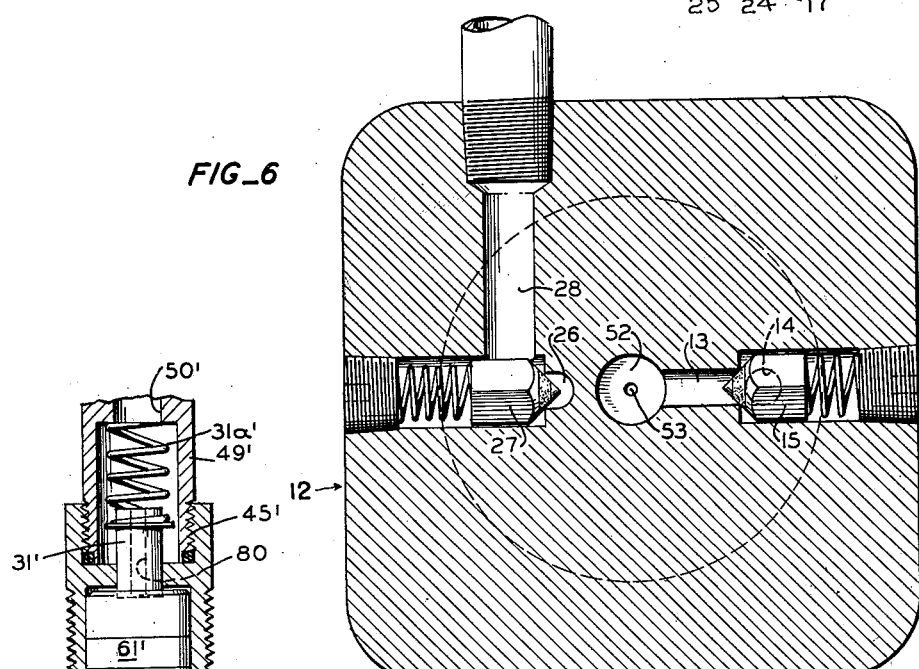
FIG_6
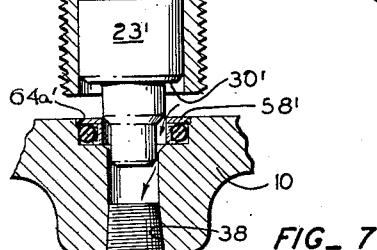
FIG_7
INVENTOR.
WILLIAM I. McLAUGHLIN
BY
Hansen and Lane
ATTORNEYS

United States Patent Office 3,093,467
Patented June 11, 1963

3,093,467
VAPOR SEPARATOR AND FILTER FOR COMPRESSED AIR
William I. McLaughlin, 10211 Darby Ave.,
Inglewood, Calif.
Filed Sept. 15, 1958, Ser. No. 760,890
5 Claims. (Cl. 55—218)

The present invention relates to an air cleaner, and pertains more particularly to a vapor separator and filter for use in a high pressure air line.

In various industrial and other uses, air under high pressure is piped from a compressor to one or more points of use. When air is compressed from atmospheric pressure to a substantial pressure, for example, of two or three hundred pounds per square inch, such air is subjected to a marked temperature rise. As such compressed air is piped to a point of use the excess heat tends to be transferred from the air to the enclosing pipe or storage tank, if the latter is employed, and thence to the ambient atmosphere or other media surrounding the pipe line or tank.

When such air is cooled below its saturation temperature, water vapor borne by the air will condense out and form water droplets. Such condensed moisture, as well as any oil vapor, and other foreign particles which may be entrained in the air when compressed, and carried along with it through the conducting pipes, is undesirable for many industrial and other uses.

One presently rapidly increasing use of compressed air is in the air spring suspension or so called "air ride" mechanism for automobiles. In such mechanisms such entrained dust, oil vapor and moisture particles are particularly objectionable, since they tend to interfere with the proper functioning of some of the controls and other mechanisms.

The present invention provides an improved vapor separator and filter for use in high pressure air lines. The invention also provides a vapor separator and filter whereby air at substantial pressure is rapidly swirled in alternately opposite directions around circular paths within a housing having substantial heat capacity and a large heat radiating exterior surface, and from which, under selected operating conditions, air is periodically suddenly vented to the atmosphere to thereby cause a drop in the temperature of the air within the housing.

The swirling air with its entrained oil and water vapor, and other foreign particles is directed toward and along the inner wall of the housing. This high speed swirling movement provides for maximum heat transfer from the air to the housing, and the centrifugal force generated thereby urges the oil vapor, water droplets condensed out of the water vapor, dust and other particles into adhering contact with the housing wall, which is washed down by the moisture collecting thereon. The air is thereafter drawn through a filter to remove any remaining foreign solids therefrom.

A further object of the invention is to provide an improved vapor separator and filter for connection to a high pressure air line.

These, and other objects and advantages of the invention, will be apparent from the following description and the accompanying drawings, wherein:

FIG. 1 is a longitudinal, diametrical, sectional view through a vapor separator and filter embodying the present invention, the air evacuating valve being closed.

FIG. 2 is an enlarged, fragmentary sectional view of the lower central portion of the mechanism shown in FIG. 1, the air evacuating valve being open.

FIG. 3 is a further enlarged perspective view of a low-friction seal ring assembly.

FIG. 4 is a side elevational view of a sleeve having a plurality of flat, annular air swirling members mounted thereon.

FIG. 5 is a sectional view taken along lines 5—5 of FIG. 1.

FIG. 6 is a sectional view taken along line 6—6 of FIG. 1.

FIG. 7 is a view similar to FIG. 2 but showing a slightly modified form of the invention.

Briefly, the form A of the invention (FIGS. 1 and 2) comprises a housing 10 having a cylindrical finned body 11 and a cap portion 12 screwed thereon. Air under high pressure enters the housing 10 through inlet passages 13 and 14 in the cap portion 12, passing a return check valve 15. The air then passes through a plurality of holes 17 in each of a plurality of annular air-swirling plates 18, 19, 20 and 21, having air deflecting blades 22, like small turbine blades, formed from the metal stamped out in forming the holes 17 therein. The blades 22 of alternate plates are sloped in opposite directions so as to swirl the air passing therethrough in opposite directions in the annular spaces between the adjacent plates.

When a lower valve member 23 is in its lowered, or closed, condition as shown in FIG. 1, the incoming air from the inlet 14, after passing through the holes 17 in the lowermost plate 21, passes upwardly between a sleeve 24, upon which the plates 18, 19, 20 and 21 are mounted, and a filter tube 25. Thence the air passes through the filter, past a second return check valve 27 and exits through an outlet port 28 whence it may be piped to a desired point of use.

At pressures above a designed maximum pressure air is suddenly evacuated from the housing 10 by the lifting of the valve member 23 to open position as shown in FIG. 2. Lifting of this valve member 23 is caused by an unbalance between the upward air pressure on a shoulder 30 formed on the valve member 23, and the combined air and spring pressure on the upper end of a poppet valve 31, which rests on the upper end of valve member 23. The space 32 between the valve member 23 and a stationary valve seat 33 is vented to atmosphere through communicating passages 34, 35 and 37 in poppet valve 31 and valve member 23.

Valve member 23 is closed immediately after each evacuation of the housing by the action of the poppet valve spring 31a. The pressure drop resulting from such evacuation has a substantial cooling effect on the air remaining within the housing 10, and, thereby on the housing 10. Condensates and other foreign matter which collects on the bottom of the housing 10 are discharged to the atmosphere through the bottom passage 38 upon each opening of the valve member 23.

Referring to the drawings in detail, the housing cap 12 may be of any suitable material, such as, for example, aluminum alloy or steel, and is provided with an internally threaded rim 39 for screwing onto the upper portion of the housing 10, which is threaded to receive it.

The housing 10 is provided with a rabbeted groove 40 on its upper edge to receive and center the peripheral portion of the uppermost air-swirling plate 18 therein. This upper plate 18 is of larger diameter than the other plates 19, 20 and 21, the latter all having a slight marginal clearance from the housing 10. All four of the air-swirling plates are secured to the sleeve 24, so that the upper plate 18 supports the entire plate assembly by its marginal engagement with the housing 10.

The sleeve 24 fits upwardly onto a downward tubular projection 41 on the cap member 12 co-axial with the threaded rim 39. The marginal clearance of the three lower plates 19, 20 and 21 from the housing 10 allows any moisture and other foreign matter therein collecting on the housing to flow downwardly toward the bottom of the housing, and this downward wash effect is assisted by air flowing through the clearance spaces between the plates 19, 20 and 21 and the housing.

The cupped, air deflecting blades 22 punched from each of the air-swirling plates 18, 19, 20 and 21 to form the holes 17 therein are curved transversely of their lengths. All of the blades 22 in each plate are sloped in the same rotative direction so as to direct the air passing through the holes 17 from which these blades are punched tangentially toward the housing wall, and to impart a turbine-like swirling effect to this air in the annular space beyond each annular plate.

The blades 22 of alternate plates are sloped in opposite rotative directions, so that the air passing through these plates is rapidly swirled, first in one direction, and then in the opposite direction, in the annular spaces below the successive plates. This alternate swirling action provides an extremely long air travel from the time the air leaves the inlet passage 14 until it enters the space 42 between the plate supporting sleeve 24 and the filter tube 25.

The filter tube 25 is of suitable material to have the mechanical strength required, and also to have a required filtering action. For example, a sintered bronze filter of sufficient fineness to remove dust and other air-borne particles of somewhat less than $\frac{1}{100}$ of an inch in diameter has proved satisfactory for use on some automobile airspring installations.

The upper end of the filter tube 25 is fitted into a rabbeted groove 43 provided therefor in the lower end of the tubular cap extension 41, and seats against a cushioning washer 72 which may be of rubber. The lower end of the filter tube 25 fits around the upper end of a valve seat member 45, having the poppet valve seat 33 therein, and is supported against downward displacement by the upper end of a tubular portion 47 of a skirt member 48.

The skirt portion 48 shields the portion therebelow from the swirling air from the lowermost plate 21, so as to reduce turbulence in the lower portion of the housing below the skirt 48.

The tubular portion 47 is screwed for support onto the externally threaded lower portion of the valve seat member 45, which is also threaded internally at its upper end for screwing onto a coupling 49. The coupling 49 has an inwardly extending shoulder 50 therein, and the poppet valve spring 31a is held in compression between this shoulder and the poppet valve 31.

The upper end of the coupling 49 is threaded internally for screwing onto the lower end of a nipple 52 having a small diameter axial bore 53 therethrough. The upper end of the nipple 52 is screwed into a downward axial projection 54 of the cap 12 and openly communicates with the air inlet line B screwed into central cap opening 57. Thus, air pressure from the main supply line B is communicated through the small, restrictive bore 53 of the nipple 52 with the interior of the coupling 49, where it exerts a downward, closing pressure on the top of the poppet valve 31.

The lower valve member 23 is of suitable material, for example, aluminum with hard, anodized finish, or stainless steel, and comprises a main body 23a fitted for slidable axial movement within the lower end of the valve seat member 45. A first downward extension 23b of reduced diameter is provided on the valve body 23a of a size to fit slidably into a seal 58, and a second downward extension 23c, of further reduced diameter, is provided below the first extension 23b.

This lower extension 23c is of slightly smaller diameter than the discharge passage 38 (FIGS. 1 and 2) in which it rides, and preferably is of a length to remain therein even when the valve member 23 is raised to maximum open condition as shown in FIG. 2. Air released from the housing 10 upon each opening of the valve member 23 thus must pass between the lower valve extension 23c and the passage 38 in which it rides, so that the amount of clearance between these two parts controls the rate of evacuation of air from the housing 10 upon each opening of the valve member 23. For maximum rate of discharge this lower portion 23c can be removed altogether.

Seals 60 of a suitable type, and which may be rubber or neoprene O rings or washers, are provided as required throughout the mechanism A. To cut down frictional resistance during axial movement of the valve member 23, however, a modified form of seal is preferred at 58 and 61 for sealing the valve member 23.

The seal 61 comprises a resilient backing member, for example, a conventional O-ring 61a, which may be of neoprene, with a channel covering member 61b mounted thereon and exposed on the open side of the seal groove 62 to bear against the smooth inner surface of the valve seat member 45. This channel member 61b is of a material having a low coefficient of friction, preferably the material known at Teflon. The outer face of the channel member 61b is of a width to fill the seal groove 62, and the backing ring 61a is of a cross-sectional diameter sufficient to resiliently bias the channel member 61b into sealing engagement with the inner face of the valve seat member 45.

The lower seal 58 is generally similar to the seal 61, with the exception that its low-friction channel member 58b is mounted radially inwardly of its resilient backing ring 58a. This lower seal 58 is mounted in a groove provided by press-fitting a metal retaining washer 65 into the counterbored upper portion 64a of a rabbeted groove 64.

Operation of the form A of the invention (FIGS. 1 and 2) is as follows: The housing cap intake opening 57 is connected to a suitable pipe line B, the other end of which may be connected either to the outlet of a usual air compressor (not shown) having conventional, suitable, pressure control mechanism, also not shown, to provide air at desired maximum pressure, for example three hundred pounds per square inch. The mechanism A also may be mounted at the outlet of a compressed air tank, in a compressed air service line, or between such service line and a tool or other mechanism.

The air enters the housing 10 from the line B through the inlet passages 13 and 14 and passes the first return check valve 15. This inlet air pressure also is transmitted, through the restricting small bore 53 of the nipple 52 and the coupling 49, to the exposed upper end of the poppet valve 31. This downward air pressure on the poppet valve 31, plus the additional downward pressure exerted thereon by the coil spring 31a, urges the poppet valve toward closed condition, and in its closed condition the valve member 23 will also be in its closed condition as shown in FIG. 1.

Assuming, first that the outlet port 28 from the housing 10 is open and unrestricted, high pressure air entering the housing 10 through the inlet passage 14 flows at high velocity through the holes 17 in the topmost plate 18, and in so doing is directed by the turbine-like blades 22 within the holes 17 tangentially toward the housing wall and is thus caused to swirl rapidly around in the annular space 67 between the topmost plate 18 and the next lowermost plate 19. An opposite or reversed swirling effect is caused by the reversed slope of the blades 22 as the air passes through the holes 17 in each of the successively lower plates 19, 20 and 21.

This rapid and successively reversed swirling movement of the air causes it to travel a relatively great distance, and also brings it into high velocity wiping contact with the housing 10 for effective heat transfer thereto. The finned external surface 68 of the housing 10 tends to dissipate, by convection, the heat transferred thereto by the swirling air, which, as mentioned previously herein, has been heated by compression in the compressor from which it is piped.

Cooling of the air during this alternately reversed swirling travel causes water vapor borne thereby to condense out in the form of water droplets, which, thrown outwardly by the tangential direction of the air flow from the vanes 22, and centrifugal force, impinge against and collect on the inside of the housing 10. Most of the fine air borne particles tend to unite by ionic attraction, and, when they impinge against the housing wall are trapped in the moisture which collects thereon from the water droplets. This moisture, with the trapped oil vapor and foreign particles therein, tends by gravity to flow or wash down the side of the housing 10, and is assisted in its downward travel by air flowing downwardly past the outer edges of the three lower perforated plates 19, 20 and 21, which, as mentioned previously herein, are spaced slightly from the housing 10.

After passing through the lowermost perforated plate 21, when the valve 23 is closed, the swirling air in the space between the plate 21 and the skirt 48 flows between the latter and the lower edge of the sleeve 24 and upwardly into the space between the sleeve and the filter tube 25. Thence it flows through the filter, which filters out any foreign particles which may have escaped entrapment by the moistened housing wall, and exits through the outlet passage 26, and the outlet port 28, passing the second return check valve 27. From the outlet port 28 the air may be piped, in a usual manner, to a desired point of use.

When the air pressure within the housing 10 increases, for example, upon closing off or restricting substantially the flow of air from the outlet port 28, this pressure is transmitted through the space between the periphery of the skirt 48 and the housing, and exerts an upward pressure on the downwardly facing shoulder 30 on the valve member 23. This upward pressure tends to raise the valve member 23, and with it the poppet valve 31 resting thereon, which must be raised to open condition before the valve member 23 can move to its open condition. This opening force exerted on the valve member 23 is resisted by a closing force consisting of the spring pressure of the valve spring 31a plus the air pressure exerted on the upwardly directed surfaces of the poppet valve 31 above its valve seat 33.

As mentioned previously herein, the space 32 between the valve member 23 and the fixed valve seat 33 is vented to atmosphere through the vent passages 34, 35 and 37. The area of the shoulder 30 is made sufficiently greater than that of the upwardly directed top portions of the poppet valve 31 above its seat 33, so that when the air pressure within the housing 10 increases to a point determined by these relative areas and the strength of the poppet valve spring 31a, the resultant upward force on the valve member 23 is greater than the combined downward forces exerted by the spring 31a and the air pressure on the poppet valve 31, and therefore opens both valves 23 and 31. Such valve member areas and valve spring strength may be readily calculated by any one ordinarily skilled in the art of pneumatics to provide a desired operation for a given set of requirements.

As soon as the poppet valve 31 clears its seat 33, air will be evacuated from within the coupling 49 to atmosphere past the poppet valve 31 and through the passages 34, 35 and 37. This equalizes the pressure on both sides of the poppet valve head, leaving only the pressure of the spring 31a to resist the opening force on the shoulder 30, so that the valve member 23 is forced fully open, as shown in FIG. 2. The air flow through the passage 37 is restricted sufficiently to prevent the valve member 23 from rising with sufficient force to strike the valve seat 33 and thus cause "hammering."

Opening of the valve member 23 suddenly releases the highly pressurized air from the housing 10 to atmosphere through the bottom passage 38. The rate of this release may be controlled as desired by increasing or decreasing the amount of clearance between the lower valve member extension 23c and the exhaust passage 38 in which it rides.

The reduction in air pressure within the housing 10, and thereby on the shoulder 30, caused by this sudden release of air from the housing, reduces the upward pressure on the shoulder 30 and thus allows the pressure of the spring 31a to re-close the poppet valve 31 as shown in FIG. 1, ready for a repetition of the cycle. Upon each opening of the valve member 23, air, and the collected water, oil and foreign matter washed down from the housing wall will be ejected through the discharge passage 38 in a fraction of a second, whereupon, as the pressure in the housing drops, the spring 31a closes both the poppet valve 34 and the valve member 23.

Each sudden drop of air pressure within the housing, by the well known principle of Charles' law, lowers the temperature of the air within the housing 10. As this cooling effect is repeated upon each opening of the valve member 23, it exerts an additional cooling effect on the housing 10, thereby assisting in the condensation and removal of the moisture carried as water vapor by the air upon entering the housing. The filter 25 additionally effectively removes damaging air borne dust and dirt particles from the air.

The modified form of the invention shown in FIG. 7 is for use in installations where it is desired to purge the housing only at each time the air feed to the housing shuts off.

Since the parts shown in FIG. 7 are the same as those shown in FIGS. 1 and 2, with the exception of the vent passages through the valves, the same reference numbers will be used for these similar parts, with the prime (') added.

In FIG. 7 the poppet valve 31' has a vent opening 80 axially entirely therethrough. The valve member 23' has no vent opening therein. Also no seal is provided on the poppet valve 31, so that the latter acts merely to transmit the downward closing force of the spring 31a' to the lower valve member 23'.

The operation of this modified valve form is as follows: When air under high pressure fills the housing 10' this high pressure is transmitted through the vent 80 and the unsealed joint between the poppet valve 31' and the lower valve member 23 to the space between the lower valve member 23 and the valve seat 33, thereby exerting a downward pressure on the valve member 23, which together with the pressure of the spring 31a' insures that the valve member 23 will not open no matter how high the pressure should become.

This valve arrangement is for use, among others, on installations operating at high pressures, for example, of the order of 350 p.s.i., and with the pressure controlled within close limits. Such conditions exist in some airspring mechanisms for automobiles, and the device A in such installations is preferably mounted between the usual compressor, not shown, and storage tank, also not shown.

As an example of the operation of a mechanism arranged as shown in FIG. 7, each time the compressor shuts off, air pressure in the line B, and, through the communicating passages explained previously herein, in the space 32' above the valve member 23', drops rapidly from a selected operating pressure, for example 350 p.s.i., to a relatively low pressure, for example, approximately 35 p.s.i. in about ten seconds. The check valve 15, however, prevents rapid loss of pressure from the interior of the housing 10 through the inlet 14, while the other check valve 27 prevents back flow of air into the housing through the outlet 26.

The air pressure on the shoulder 30, being no longer counterbalanced by a corresponding pressure on top of the valve member 23, forces the valve member 23 open, thus purging the housing. In this manner the modified valve mechanism shown in FIG. 7 will evacuate the housing once on each shut down of the compressor, but at no other time. Since the pressure in such a system is held within close limits, resulting in frequent, short run operations of the compressor, this results in purging of sufficient frequency to be satisfactory, and avoids loss of air while the compressor is operating.

The invention provides a simple and effective vapor separator and filter for use in a high pressure air line.

While I have illustrated and described a preferred embodiment of the present invention, and one modification thereof, it will be understood, however, that various changes and modifications may be made in the details thereof without departing from the scope of the invention as set forth in the appended claims.

Having thus described the invention, what I claim as new and desire to protect by Letters Patent is defined in the following claims.

I claim:

1. A vapor separator and filter for compressed air comprising a housing adapted to be mounted in upright position, and having an inlet for untreated highly pressurized air, said housing having also an outlet for treated air in the upper portion of the housing, and having a dump outlet in the bottom thereof, a first valve member mounted for limited movement for opening and closing the dump outlet, the upper end of said first valve member being shielded from the housing air pressure and being vented to atmosphere, a shoulder facing toward the dump outlet and acting on the first valve member, said shoulder being exposed to air pressure within the housing, a second valve member riding on the first valve member for movement therewith, the top of the second valve member being of smaller effective area than said shoulder, an enclosure over the second valve member, said enclosure communicating with pressurized air through a small passage, said enclosure being sealed from atmosphere with the valve members in dump outlet closing position and being vented to atmosphere with the valve members in dump outlet opening position, and spring means urging both valve members toward dump outlet closing position, whereby, when the air pressure acting on the exposed valve shoulder overcomes the combined air and spring pressure on the second valve member, both valve members are moved thereby to dump valve opening position to discharge through the dump outlet pressurized air from the housing together with any liquid collected in the bottom of the housing, thereby venting to atmosphere both the valve shoulder and the enclosure over the second valve member and allowing the spring means to again move both valves to their dump outlet closing condition.

2. A vapor separator and filter for compressed air comprising a housing adapted to be mounted in upright position and having an inlet for supplying highly pressurized, untreated air to the housing, said housing having also an outlet for untreated air near the upper end thereof and having a dump outlet in the bottom thereof, means for deflecting pressurized air entering the housing through the inlet to thereby create a swirling movement of air within the housing, a filter operatively interposed between the inlet and the treated air outlet, a tubular valve guide mounted in the housing, a first valve member mounted for limited movement in said valve guide and shaped and positioned to seal the dump outlet in one limit of movement thereof, a downwardly directed shoulder on the first valve member exposed to air pressure within the housing, the upper end of said first valve member being enclosed within the valve guide, a valve seat in the valve guide above said valve member, a second valve member on said first valve member and in sliding, sealing relation with the valve seat, the space between the first valve member and the valve seat being vented to atmosphere to retain the pressure on the exposed top of the first valve member at atmospheric, the top of the second valve member being of smaller area than said shoulder, and spring means urging both valve members toward dump outlet closing position, the total combined pressure of the spring means and housing air on the second valve member being less than the air pressure on said shoulder at a selected air pressure within the housing to thereby move the first and second valve members to dump valve opening position upon the attainment of such selected air pressure for the rapid discharge from the housing of air and collected liquid through the dump outlet.

3. A vapor separator for compressed air comprising a housing adapted to be mounted in upright position and having an inlet for attachment to a high pressure air line, said housing having also an outlet for treated air, and having a dump outlet in the bottom thereof, means for deflecting pressurized air entering the housing from the inlet to thereby create a swirling movement of air within the housing, a tubular valve guide mounted in the housing, a first valve member mounted for axial slidable movement in said guide, a small diameter extension on the lower end of the first valve member being formed and positioned to enter and seal the dump outlet, a downwardly facing shoulder on the first valve member exposed to the air pressure within the housing, the upper end of the first valve member being exposed to atmospheric pressure within the valve guide, a valve seat above the first valve member, a second valve member in sealing relation with the valve seat and riding on the first valve member, and spring means urging the second valve member downwardly to thereby urge the first valve member toward dump outlet closing position, the spring pressure on the second valve member being less than the air pressure on the shoulder at a selected air pressure within, the housing to thereby raise the valve members and withdraw the first valve member extension from the dump outlet for the rapid discharge of air through the dump outlet, thereby to purge the housing and lower the air pressure and temperature within the housing.

4. An arrangement according to claim 1 wherein a lower end portion of the first valve member is positioned within the dump outlet and exposed to atmospheric pressure therein with the valve members in their dump outlet closing position, and is elevated into the housing for exposure to pressurized air therein upon movement of the valve members to dump valve opening position to thereby assist in moving said first valve member toward its open limit of movement for a complete purging of the housing.

5. A vapor separator and filter for compressed air comprising a housing, means within said housing for condensing vapor from and filtering compressed air, said housing having an inlet thereinto for the reception of compressed air, an outlet therefrom above the bottom thereof, and a dump port in the bottom thereof, said inlet having a check valve therein to prevent backflow of air from said housing, a valve member in said housing movable down and up to close and open said dump port, said valve member having an enlarged portion within said housing and upwardly from the bottom thereof defining a downwardly facing shoulder, means guiding said valve member for said vertical movement and exposing said shoulder to housing pressure, means defining a passage isolating the upper end of said valve member from housing pressure, said passage opening into said inlet upstream from said check valve, and means resiliently urging said valve downwardly into dump port closing position, said upper end of said valve having an area relative to the area of said shoulder such that when the pressure in said inlet upstream of said check valve is approximately equal to the pressure within said housing, the pressure of said resilient means and the pressure on said upper end overbalances the pressure on said shoulder to maintain said valve in dump port closing position, said shoulder having an area sufficient to overbalance the pressure of said resilient means and the pressure on said upper end of said valve upon a substantial pressure drop in said inlet upstream of said check valve.

References Cited in the file of this patent

UNITED STATES PATENTS

| | | |
|---|---|---|
| 1,831,805 | Donaldson | Nov. 17, 1931 |
| 1,934,674 | Lichtenthaeler | Nov. 7, 1933 |
| 2,058,189 | Stuard | Oct. 20, 1936 |
| 2,290,323 | Graham | July 21, 1942 |
| 2,669,320 | Shaw | Feb. 16, 1954 |
| 2,692,655 | Peeps | Oct. 26, 1954 |
| 2,726,732 | Faust et al. | Dec. 13, 1955 |
| 2,765,871 | Mair | Oct. 9, 1956 |
| 2,878,753 | Adams et al. | Mar. 24, 1959 |
| 2,917,072 | Saville | Dec. 15, 1959 |
| 2,958,394 | Woodmansee | Nov. 1, 1960 |

FOREIGN PATENTS

| | | |
|---|---|---|
| 764,871 | Great Britain | Jan. 2, 1954 |